United States Patent
Sutardja et al.

(10) Patent No.: US 9,144,137 B1
(45) Date of Patent: Sep. 22, 2015

(54) DIODE EMULATOR CIRCUIT

(71) Applicant: Marvell International Ltd., Hamilton (BM)

(72) Inventors: Sehat Sutardja, Los Altos Hills, CA (US); Pantas Sutardja, Los Gatos, CA (US); Wanfeng Zhang, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 353 days.

(21) Appl. No.: 13/856,295

(22) Filed: Apr. 3, 2013

Related U.S. Application Data

(60) Provisional application No. 61/619,593, filed on Apr. 3, 2012.

(51) Int. Cl.
*H05B 37/00* (2006.01)
*H05B 37/02* (2006.01)

(52) U.S. Cl.
CPC ..................................... *H05B 37/02* (2013.01)

(58) Field of Classification Search
None
See application file for complete search history.

(56) References Cited

U.S. PATENT DOCUMENTS

| 2009/0153127 A1* | 6/2009 | Chen .............................. 323/350 |
| 2010/0052629 A1* | 3/2010 | Chu et al. ....................... 323/239 |
| 2010/0194369 A1* | 8/2010 | Nagai et al. .................... 323/284 |

* cited by examiner

*Primary Examiner* — Long Nguyen

(57) ABSTRACT

A controller for a buck regulator for a lighting system including light emitting diodes includes a voltage control loop configured to compare a voltage reference and a feedback voltage. The feedback voltage is based upon a DC supply voltage to the controller. A voltage regulator is configured to receive an output of the voltage control loop and to generate a current reference. A current control loop is configured to receive a feedback current and to compare the current reference to the feedback current. A current regulator is configured to receive an output of the current control loop. A pulse width modulation circuit is configured to receive an output of the current regulator and to generate drive signals for first and second switches of the buck regulator.

14 Claims, 6 Drawing Sheets

DIODE EMULATOR CIRCUIT

CROSS-REFERENCE TO RELATED APPLICATIONS

This application claims the benefit of U.S. Provisional Application No. 61/619,593, filed on Apr. 3, 2012. The disclosures of the above applications are incorporated herein by reference in their entirety.

FIELD

The present disclosure relates to diode emulator circuits, and more particularly to diode emulator circuits for lighting systems including light emitting diodes (LEDs).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Over the next few years, consumers will transition from incandescent light bulbs to more efficient light bulbs such as compact fluorescent light (CFL) bulbs and light emitting diode (LED) light bulbs in an effort to reduce power consumption. Cost and performance will be a factor affecting how quickly the transition will occur and which light technology will be selected by consumers.

LED light bulbs include multiple diodes that are powered using direct current (DC) power. Typically, alternating current (AC) power needs to be converted by a rectifier to generate a regulated current output at low voltage. In addition, during operation, the LED light bulbs should be protected from line-voltage fluctuations. LED light output is proportional to current. Therefore, changes in supply voltage can cause a disproportionate change in current, which can cause light output to vary.

During dimming, CFL or LED light bulbs will sometimes turn off before a slider of a dimming switch reaches a lowest setting. After being dimmed to a low light level and switched off, CFL or LED bulbs will sometimes not turn on until a position of the slider is increased. This can be especially challenging in 3-way configurations where lights can be turned on/off from different locations.

Operation of dimmable CFL and LED light bulbs can also be influenced by line voltage fluctuations. Incandescent bulbs will sometimes dim or flicker when a device such as air-conditioning or a hair dryer is used. Likewise, dimmed CFL or LED light bulbs can actually turn off or flicker excessively.

SUMMARY

A controller for a buck regulator for a lighting system including light emitting diodes includes a voltage control loop configured to compare a voltage reference and a feedback voltage. The feedback voltage is based upon a DC supply voltage to the controller. A voltage regulator is configured to receive an output of the voltage control loop and to generate a current reference. A current control loop is configured to receive a feedback current and to compare the current reference to the feedback current. A current regulator is configured to receive an output of the current control loop. A pulse width modulation circuit is configured to receive an output of the current regulator and to generate drive signals for first and second switches of the buck regulator.

In other features, the voltage control loop includes a feedback voltage generator configured to generate the feedback voltage, a reference voltage generator configured to generate the reference voltage, and a summer configured to generate a difference between the feedback voltage and the reference voltage. The feedback voltage generator includes a voltage divider configured to receive the DC supply voltage and to generate the feedback voltage. In other features, the controller is implemented as an integrated circuit.

In other features, a system includes the controller, the first switch, and the second switch. The system is implemented as an integrated circuit. The system includes an inductor having an input terminal connected between terminals of the first switch and the second switch, and a plurality of light emitting diodes connected in series and having one end connected to the inductor. Another end of the plurality of light emitting diodes is connected to one of the DC supply voltage and ground.

In other features, a DC power supply is configured to supply the DC supply voltage to the controller. A capacitor is connected in parallel to the DC power supply and the controller. A diode bridge is connected to an AC signal source. A transformer has one terminal of a primary side in communication with the diode bridge and one terminal of a secondary side in communication with the controller. A diode is connected in series between the one terminal of the secondary side and the controller. A third switch is connected to another terminal of the primary side of the transformer. An AC/DC controller is configured to control the third switch to generate the DC supply voltage at an input of the controller and a terminal of the first switch.

In other features, a resistor is connected between one terminal of the second switch and ground. The current control loop is connected between the resistor and the one terminal of the second switch.

A diode emulator includes the controller, a first switch having a control terminal connected to a first output of the controller, and a second switch having a control terminal connected to a second output of the controller. A first terminal of the first switch is connected to the DC supply voltage. A second terminal of the first switch is connected to a first terminal of the second switch. A resistor is connected between a second terminal of the second switch and ground. An inductor has one end connected to the first terminal of the second switch. A plurality of light emitting diodes is connected in series. One end of the plurality of light emitting diodes is connected to another end of the inductor. Another end of the plurality of light emitting diodes is connected to one of ground and the DC supply voltage.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
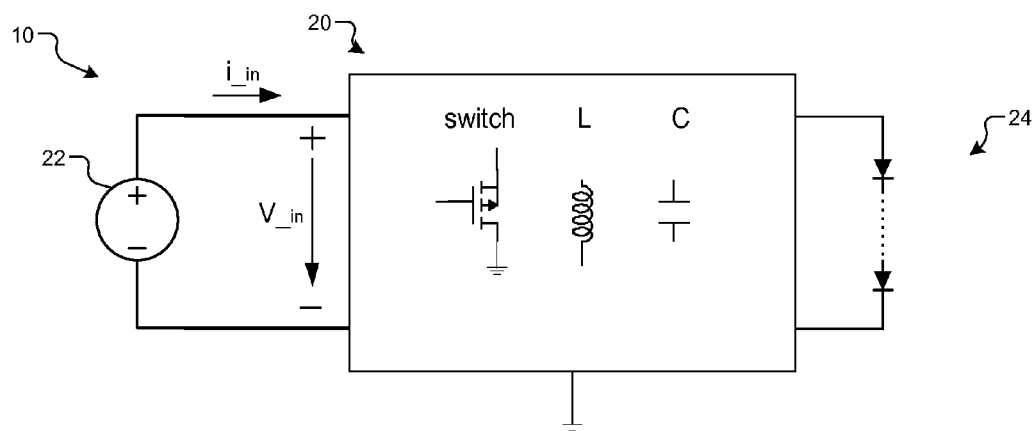
FIG. 1 is a functional block diagram of an example of a diode emulator circuit including LEDs according to the present disclosure.

Referring now to FIG. 1, a lighting system 10 including a diode emulator circuit 20 and LEDs 24 is shown. The LEDs 24 may be arranged in an LED light bulb. The diode emulator circuit 20 includes one or more active switches, inductors and capacitors, as will be described further below. A DC supply 22 provides current and voltage to the diode emulator circuit 20. The current and voltage characteristics at the input of the diode emulator circuit 20 resemble input current and voltage characteristics of a diode.

Figure 2:
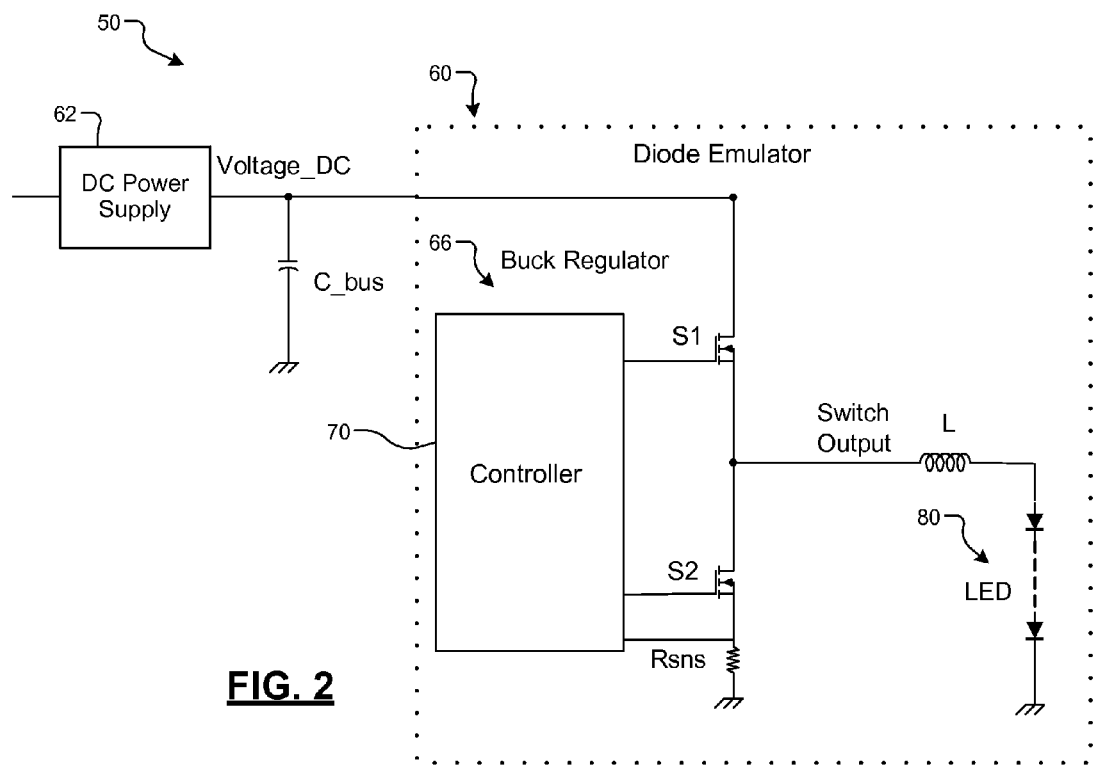
FIG. 2 is a functional block diagram of an example of a diode emulator circuit including a low-side buck regulator according to the present disclosure.

Referring now to FIG. 2, a lighting system 50 including a diode emulator circuit 60 is shown. A DC power supply 62 provides DC voltage and current to the diode emulator circuit 60. A capacitor $C_{bus}$ provides buffering. In some examples, the DC power supply 62 is a constant power supply at one DC voltage level or multiple DC voltage levels. The diode emulator circuit 60 includes a low-side buck regulator 66 including a controller 70, switches S1 and S2, a resistor $R_{sns}$, an inductor L and a plurality of LEDs 80. In one example, the plurality of LEDs 80 is connected in series. The diode emulator circuit 60 controls the average DC voltage supplied to the plurality of LEDs 80.

Control terminals of the first and second switches S1 and S2 are connected to outputs of the controller 70. A first terminal of the switch S1 is connected to the DC power supply 62 and the capacitor $C_{bus}$. A second terminal of the switch S1 is connected to a first terminal of the switch S2. The first terminal of the resistor $R_{sns}$ is connected to the second terminal of the switch S2. The second terminal of the resistor $R_{sns}$ is connected to a reference potential such as ground. A sense input of the controller 70 is connected to a node between the second terminal of the switch S2 and the resistor $R_{sns}$. The second terminal of the switch S1 and the first terminal of the switch S2 are connected to a first terminal of the inductor L. A second terminal of the inductor L is connected to the plurality of LEDs 80.

The diode emulator circuit 60 in FIG. 2 is based on a buck topology. More particularly, the buck topology shown in FIG. 2 is a low-side buck regulator. The input voltage and current of the diode emulator circuit 60 emulate the input voltage and current of a diode. The DC power supply 62 charges the capacitor $C_{bus}$ and at the same time sources the LED load through the low-side buck regulator 66. The capacitor $C_{bus}$ acts as a buffer between the DC power supply 62 and the diode emulator circuit 60.

Input current as a function of input voltage of the diode emulator circuit 60 is similar to a diode. This is implemented by the controller 70 of the low-side buck regulator 66. The LED load current and voltage is a function of the input power. The power level of the DC power supply 62 can be varied in different applications. For example only, the power level of the DC power supply 62 can be varied during a dimming process of the LED lighting system. In some examples, the controller 70 is implemented as an integrated circuit. In other examples, the controller 70 and the switches S1 and S2 are implemented as an integrated circuit.

Figure 3:
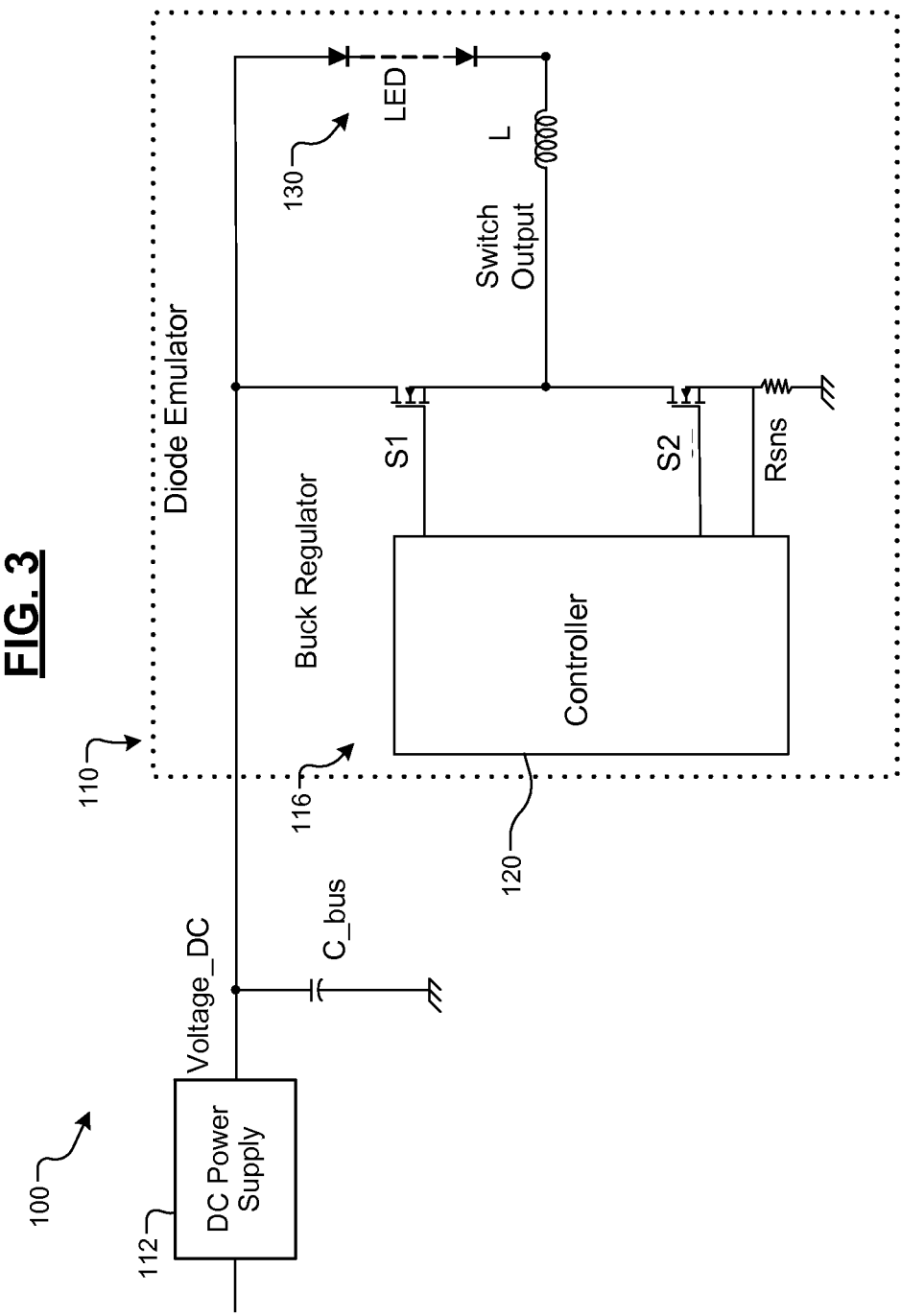
FIG. 3 is a functional block diagram of an example of a diode emulator circuit including a high-side buck regulator according to the present disclosure.

Referring now to FIG. 3, a circuit 100 including a diode emulator circuit 110 is shown. A DC power supply 112 provides DC voltage and current to the diode emulator circuit 110 and to a capacitor $C_{bus}$. The diode emulator circuit 110 includes a high-side buck regulator 116 including a controller 120, switches S1 and S2, a resistor $R_{sns}$, an inductor L and LEDs 130.

Control terminals of the first and second switches S1 and S2 are connected to an output of the controller 120. A first terminal of the switch S1 is connected to the DC power supply 112, the capacitor $C_{bus}$ and one end of the plurality of LEDs 130. A second terminal of the switch S1 is connected to a first terminal of the switch S2. The first terminal of the resistor $R_{sns}$ is connected to the second terminal of the switch S2. The second terminal of the resistor $R_{sns}$ is connected to a reference potential such as ground. An input of the controller 120 is connected to a node between the second terminal of the switch S2 and the resistor $R_{sns}$. The second terminal of the switch S1 and the first terminal of the switch S2 are connected to a first terminal of the inductor L. A second terminal of the inductor L is connected to the plurality of LEDs 130.

The input current as a function of input voltage of the high-side buck regulator 116 is similar to a diode. The LED load current and voltage is a function of the input power. The power level of the DC power supply 112 can be varied in different applications. For example only, the power level of the DC power supply 112 can be varied during a dimming process of the lighting system.

In some examples, the controller 120 is implemented as an integrated circuit. In other examples, the controller 120 and the switches S1 and S2 are implemented as an integrated circuit. In some examples, the switches S1 and S2 are metal oxide semiconductor field effect transistors (MOSFET). In other examples, the switches are complementary MOSFET (CMOS) transistors.

Figure 4:
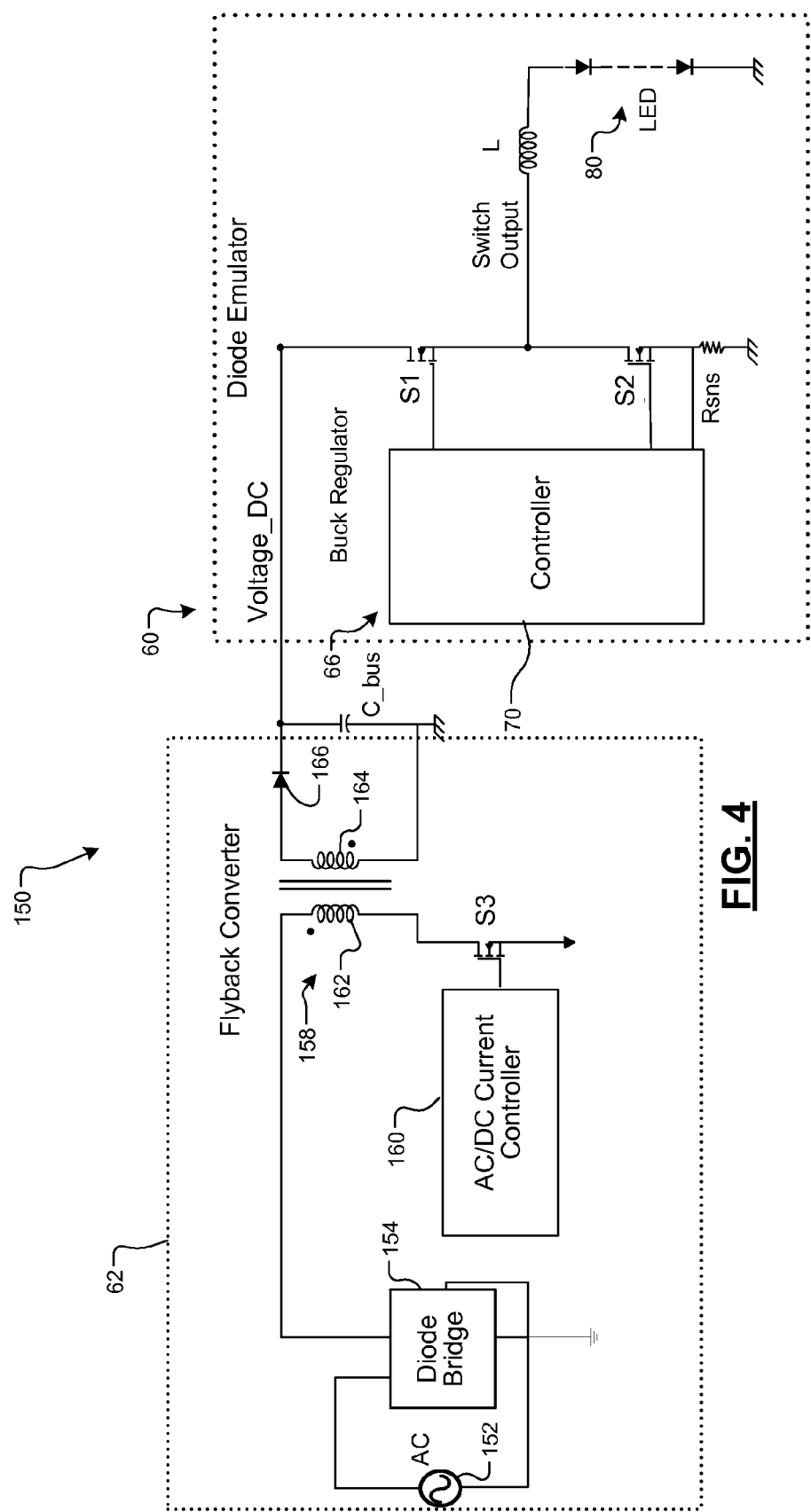
FIG. 4 is a functional block diagram of an example of a DC power supply and the diode emulator circuit of FIG. 2 according to the present disclosure.

Referring now to FIG. 4, an example of a circuit 150 including the DC power supply 62 and the diode emulator circuit 60 of FIG. 2 is shown. The DC power supply 62 is operated as a flyback converter and is connected to an AC signal source 152. The DC power supply 62 includes a diode bridge 154. An output of the diode bridge 154 is connected to one terminal of a primary side 162 of a transformer 158. Another terminal of the primary side 162 is connected to a first terminal of a switch S3. A second terminal of the switch S3 is connected to a reference potential such as ground. A control terminal of the switch S3 is connected to an AC/DC current controller 160. One terminal of a secondary side 164 of the transformer 158 is connected to a diode 166. Another terminal of the secondary side 164 of the transformer is connected to a reference potential such as ground. The diode 166 is further connected to the capacitor $C_{bus}$ and to the first terminal of the switch S1.

A flyback converter converts an AC voltage to a DC voltage. The AC/DC current controller 160 switches the switch S3 to provide a DC voltage and current. The low-side buck regulator 66 controls the current to the plurality of LEDs 80 using the controller 70, which controls the switches S1 and S2.

Figure 5:
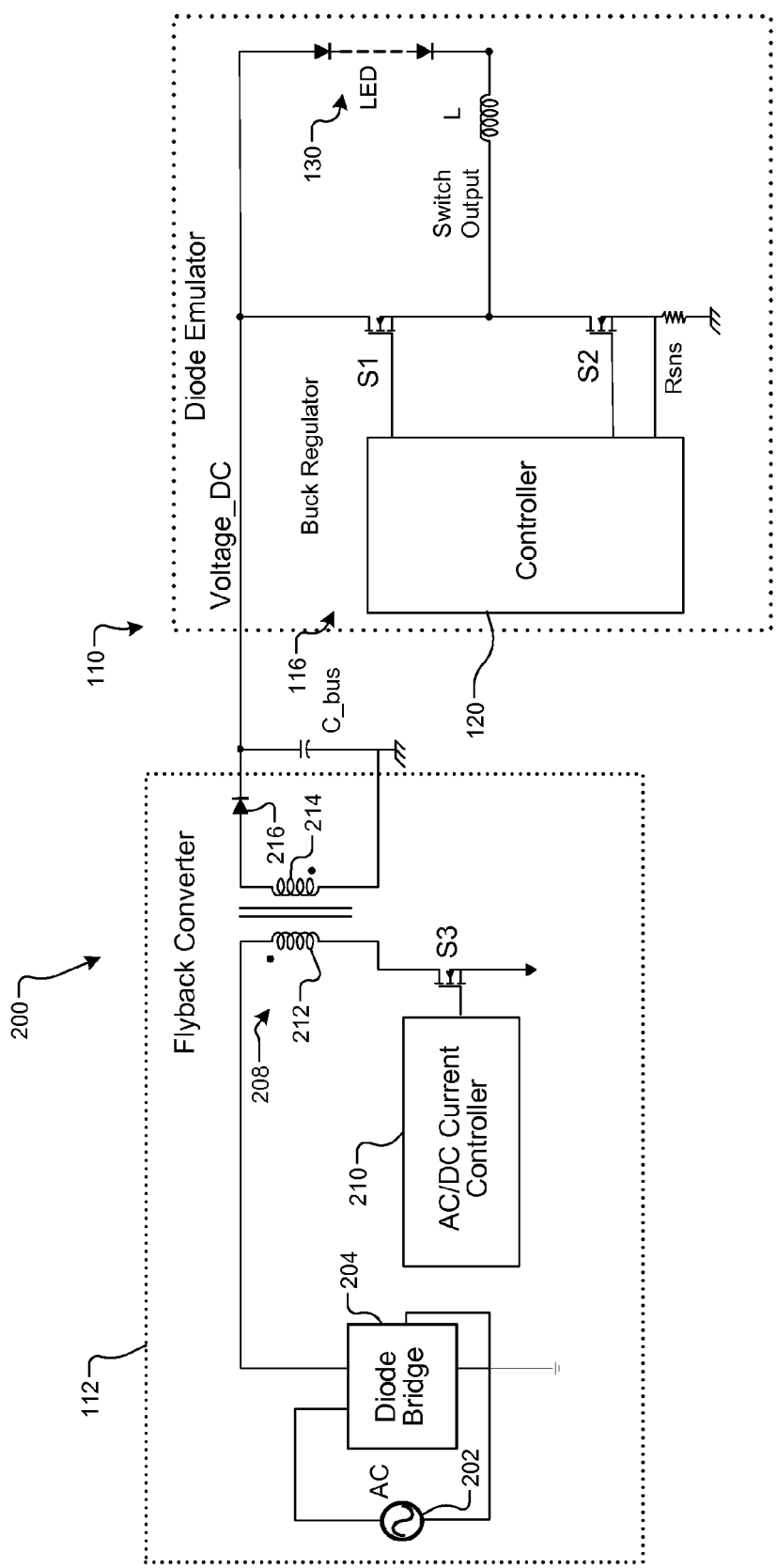
FIG. 5 is a functional block diagram of an example of a DC power supply and the diode emulator circuit of FIG. 3 according to the present disclosure.

Referring now to FIG. 5, an example of a circuit 200 including the DC power supply 112 and the diode emulator circuit 110 is shown. The DC power supply 112 includes an AC signal source 202 and a diode bridge 204. An output of the diode bridge 204 is connected to one terminal of a primary side 212 of a transformer 208. Another terminal of the primary side 212 is connected to a first terminal of a switch S3. A second terminal of the switch S3 is connected to a reference potential such as ground. A control terminal of the switch S3 is connected to an AC/DC current controller 210. One terminal of a secondary side 214 of the transformer 208 is connected to a diode 216. Another terminal of the secondary side 214 of the transformer is connected to a reference potential such as ground. The diode 216 is further connected to the capacitor $C_{bus}$, the first terminal of the switch S1 and to one end of the plurality of LEDs 130.

Figure 6:
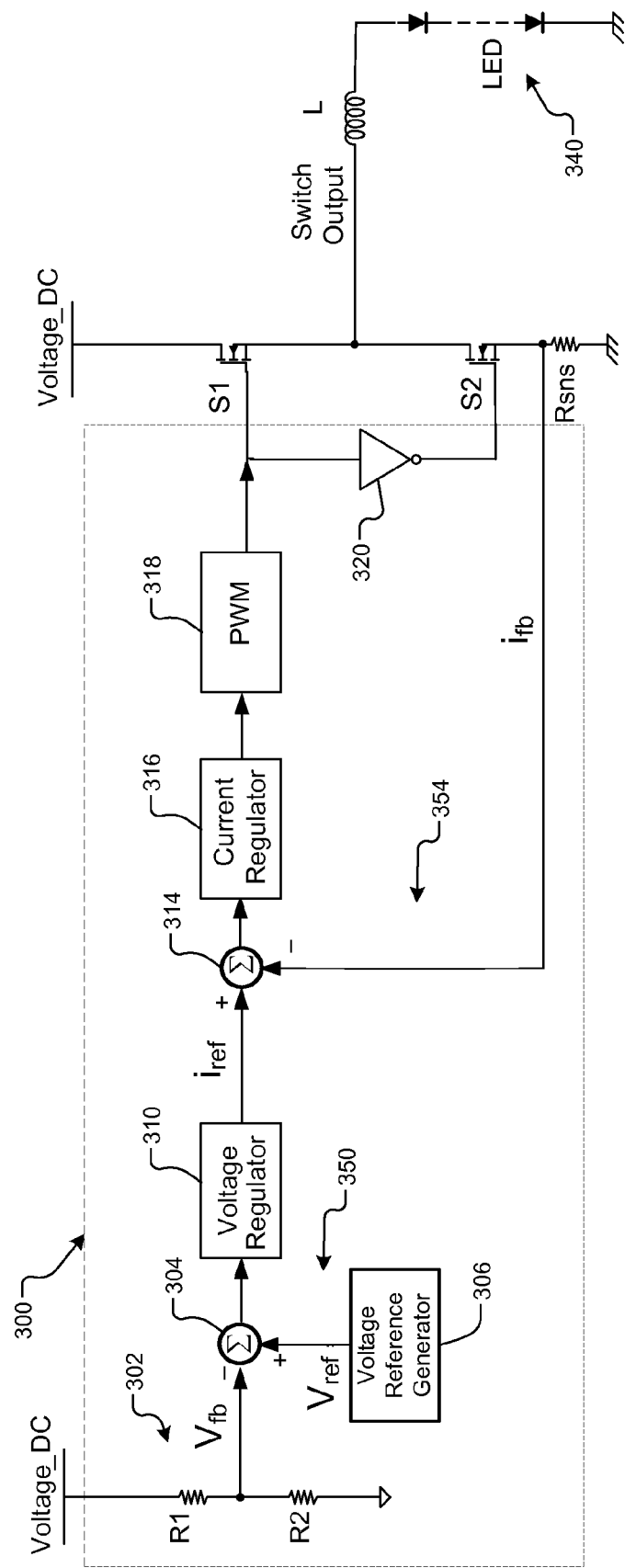
FIG. 6 is a functional block diagram of a controller for the diode emulator circuits according to the present disclosure.

Referring now to FIG. 6, an example of a controller 300 for the buck regulators in FIGS. 2-5 is shown. The DC supply voltage is received across a voltage divider 302 including resistors R1 and R2. A node between the resistors R1 and R2 generates a first feedback voltage $V_{fb}$, which is connected to one input a summer 304. A voltage reference generator 306 generates a voltage reference $V_{ref}$ that is input to another input of the summer 304. In some examples, the voltage reference generator 306 generates the voltage based on a power capacity and voltage rate of the capacitor $C_{bus}$.

An output of the summer 304 is input to a voltage regulator 310. The voltage regulator 310 generates a reference current $I_{ref}$, which is input to a summer 314. A second input of the summer 314 is connected to the node between the resistor $R_{sns}$ and the second terminal of the switch S2, which generates a feedback current $I_{fb}$.

An output of the summer 314 is input to a current regulator 316, which regulates the current $I_{fb}$ to generate a regulated current $I_{rfb}$. The regulated current $I_{rfb}$ output by the current regulator 316 is input to a pulse width modulation (PWM) circuit 318. The PWM circuit 318 generates ON/OFF drive signals that are output to the control terminal of the switch S1. An inverter 320 generates a complementary drive signal that is output to the control terminal of the switch S2. In other words, when the switch S1 is on, the switch S2 is off and vice versa.

The controller 300 includes an outer voltage feedback loop 350 and an inner current feedback loop 354. The voltage feedback loop 350 includes the voltage divider 302 including the resistors R1 and R2 that receive the input voltage to the diode emulator circuit and that generate a feedback voltage $V_{fb}$. The feedback voltage $V_{fb}$ is compared to the reference voltage $V_{ref}$. The voltage regulator 310 regulates the DC voltage to be the same as the reference voltage $V_{ref}$. In some examples, the Voltage_DC may not be a pure DC voltage because there may be voltage ripple in the AC/DC conversion stage. Therefore the feedback signal $V_{fb}$ maybe an average value of Voltage_DC. The voltage feedback loop 350 may be very slow in this type of application and the bandwidth of the voltage feedback loop 350 can be as low as one tenth of a double AC line frequency.

The output of the voltage regulator 310 is the reference $i_{ref}$ for the current feedback loop 354. The output of the current feedback loop 354 from the summer 314 is input to the current regulator 316 and then converted to a PWM signal to drive the control terminals of the switch S1 and the switch S2 via the inverter 320. In some implementations, the current feedback $i_{fb}$ is sampled only when the switch S2 is on and the switch S1 is off.

In use, when the voltage across the capacitor $C_{bus}$ is greater than the voltage reference $V_{ref}$, the controller 300 burns more power in the LED load. When the voltage across the capacitor $C_{bus}$ is less than the voltage reference $V_{ref}$, the controller 300 burns less power in the LED load. In other words, the voltage feedback loop 350 balances voltage while the current feedback loop 354 balances current to obtain a correct power balance.

Figure 7A:
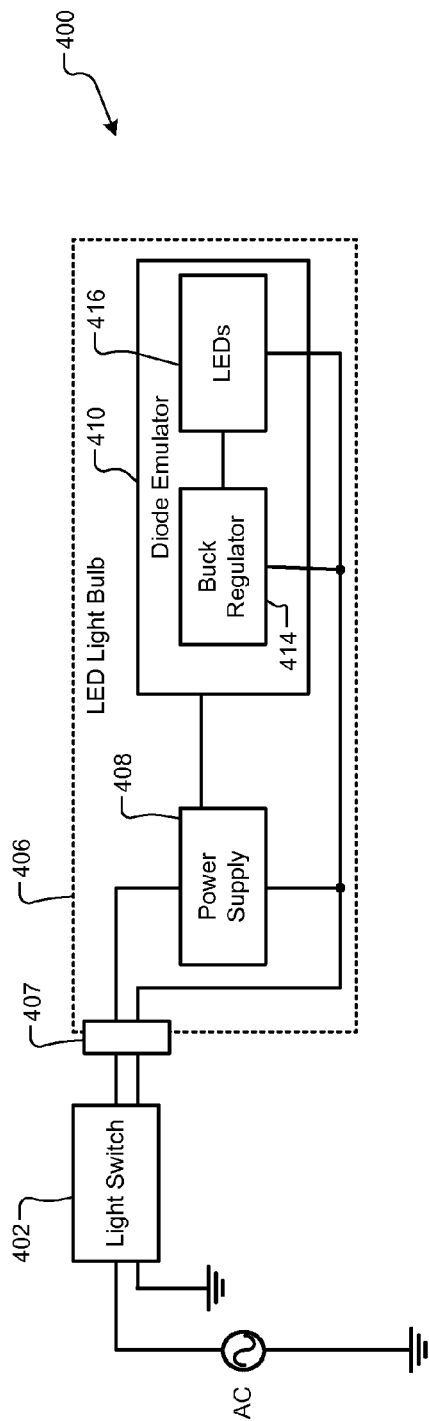
FIGS. 7A and 7B illustrate examples of lighting systems including the diode emulator circuit according to the present disclosure.
Figure 7B:
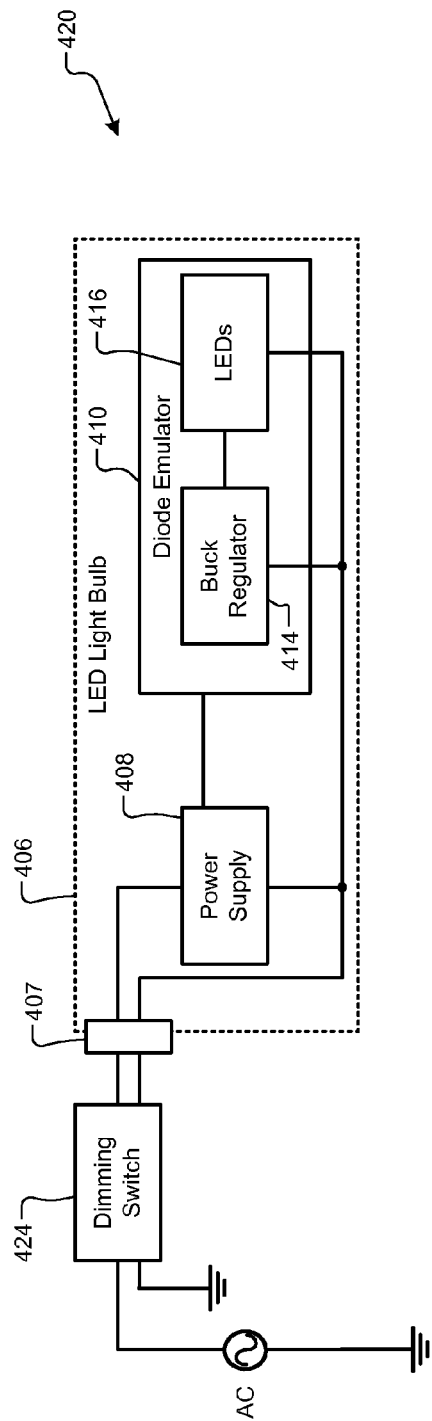

Referring now to FIGS. 7A and 7B, LED lighting systems 400 and 420 are shown, respectively. In FIG. 7A, a light switch 402 selectively supplies AC power to an LED light bulb 406 via a socket 407. An AC/DC converter 408 converts the AC power to DC supply voltage and current. A buck regulator 414 in a diode emulator 410 receives the DC supply voltage and current and supplied the plurality of LEDs 416. In FIG. 7B, the LED lighting system 420 includes a dimming switch 424.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

What is claimed is:

1. A controller for a buck regulator for a lighting system including light emitting diodes, comprising:
    a voltage control loop configured to compare a voltage reference and a feedback voltage, wherein the feedback voltage is based upon a DC supply voltage to the controller;
    a voltage regulator configured to receive an output of the voltage control loop and to generate a current reference;
    a current control loop configured to receive a feedback current and to compare the current reference to the feedback current;
    a current regulator configured to receive an output of the current control loop; and
    a pulse width modulation circuit configured to receive an output of the current regulator and to generate drive signals for first and second switches of the buck regulator.

2. The controller of claim 1, wherein the voltage control loop includes:
    a feedback voltage generator configured to generate the feedback voltage;
    a reference voltage generator configured to generate the reference voltage; and
    a summer configured to generate a difference between the feedback voltage and the reference voltage.

3. The controller of claim 2, wherein the feedback voltage generator includes a voltage divider configured to receive the DC supply voltage and to generate the feedback voltage.

4. The controller of claim 1, the controller is implemented as an integrated circuit.

5. A system comprising:
    the controller of claim 1;
    the first switch; and
    the second switch.

6. The system of claim 5, wherein the system is implemented as an integrated circuit.

7. The system of claim 5, further comprising:
an inductor having an input terminal connected between terminals of the first switch and the second switch; and
said light emitting diodes includes a plurality of light emitting diodes connected in series and having one end connected to the inductor.

8. The system of claim 7, wherein another end of the plurality of light emitting diodes is connected to one of:
the DC supply voltage; and
ground.

9. The system of claim 5 further comprising:
a DC power supply configured to supply the DC supply voltage to the controller; and
a capacitor connected in parallel to the DC power supply and the controller.

10. The system of claim 9, further comprising:
a diode bridge connected to an AC signal source; and
a transformer having one terminal of a primary side in communication with the diode bridge and one terminal of a secondary side in communication with the controller.

11. The system of claim 10, further comprising a diode connected in series between the one terminal of the secondary side and the controller.

12. The system of claim 10, further comprising:
a third switch connected to another terminal of the primary side of the transformer; and
an AC/DC controller configured to control the third switch to generate the DC supply voltage at an input of the controller and a terminal of the first switch.

13. The system of claim 5, further comprising:
a resistor connected between one terminal of the second switch and ground,
wherein the current control loop is connected between the resistor and the one terminal of the second switch.

14. A diode emulator comprising:
the controller of claim 1;
the first switch having a control terminal connected to a first output of the controller;
the second switch having a control terminal connected to a second output of the controller,
wherein a first terminal of the first switch is connected to the DC supply voltage, and wherein a second terminal of the first switch is connected to a first terminal of the second switch;
a resistor connected between a second terminal of the second switch and ground;
an inductor having one end connected to the first terminal of the second switch; and
said light emitting diodes includes a plurality of light emitting diodes connected in series, wherein one end of the plurality of light emitting diodes is connected to another end of the inductor, and wherein another end of the plurality of light emitting diodes is connected to one of ground and the DC supply voltage.

* * * * *